United States Patent
Weiner et al.

[11] Patent Number: 6,148,518
[45] Date of Patent: Nov. 21, 2000

[54] METHOD OF ASSEMBLING A ROTARY MACHINE

[75] Inventors: Harvey I. Weiner, South Windsor; Christopher G. Demers, Willington, both of Conn.

[73] Assignee: United Technologies Corporation, Hartford, Conn.

[21] Appl. No.: 09/218,705

[22] Filed: Dec. 22, 1998

[51] Int. Cl.$^7$ ............................................. B23P 15/00
[52] U.S. Cl. .................................. 29/889.2; 29/889
[58] Field of Search ........................ 29/889.2, 889, 29/428

[56] References Cited

U.S. PATENT DOCUMENTS

| | | |
|---|---|---|
| 3,183,007 | 5/1965 | Tann . |
| 4,016,636 | 4/1977 | Schneider et al. ............... 29/889.2 |
| 4,095,005 | 6/1978 | Kishida et al. ................. 427/376 B |
| 4,199,295 | 4/1980 | Raffy et al. ..................... 415/115 |
| 4,257,735 | 3/1981 | Bradley et al. .................. 415/174 |
| 4,532,054 | 7/1985 | Johnson ........................... 252/12.4 |
| 4,635,947 | 1/1987 | Hatayama ......................... 277/235 |
| 4,705,463 | 11/1987 | Joco ................................ 29/889.2 |
| 4,730,832 | 3/1988 | Cederwall et al. ............... 29/889.2 |
| 4,815,184 | 3/1989 | Johnston et al. ................. 29/889.2 |
| 4,826,397 | 5/1989 | Shook et al. ..................... 415/116 |
| 4,897,021 | 1/1990 | Chaplin et al. ................ 415/173.7 |
| 5,205,708 | 4/1993 | Plemmons et al. ............... 29/889.2 |
| 5,304,032 | 4/1994 | Bosna et al. .................... 415/200 |
| 5,364,543 | 11/1994 | Bosna et al. .................... 252/12.2 |
| 5,456,327 | 10/1995 | Denton et al. .................... 175/371 |

*Primary Examiner*—Irene Cuda
*Attorney, Agent, or Firm*—Gene D. Fleischhauer

[57] ABSTRACT

A method for assembling a rotary machine, such as a gas turbine engine, having rotor elements and associated seal lands. Various details of the method are developed for facilitating assembly of the rotary machine that are, in one embodiment, applicable to installing fan blades to a fan rotor disk while rotating the rotor disk by hand. In one embodiment, a lubricant is applied to a seal land to reduce friction between the rotor element and the seal land during assembly.

21 Claims, 7 Drawing Sheets

METHOD OF ASSEMBLING A ROTARY MACHINE

DESCRIPTION

1. Technical Field

This invention relates to a method for assembling rotary machine such as a portion of a gas turbine engine having a stator assembly and a rotor assembly. More particularly, it relates in one embodiment to a compressor which has a fan rotor, which has rotor blades and stator vanes, and which has seal lands extending circumferentially with respect to the clearance between the stator assembly and the rotor assembly.

2. Background of Invention

Rotary machines are used to transfer energy between a flow path for working medium gases and rotating elements inside the machine. There are many examples of such machines in widely disparate fields of endeavor.

FIG. 1 shows a side elevation view of the turbofan engine 10 having an axis of rotation Ar. It is one example of a rotary machine of the gas turbine engine type. The turbofan engine is widely used for powering commercial aircraft and military aircraft.

The turbofan engine 10 has a compression section 12, a combustion section 14 and a turbine section 16. The compression section has an annular (core) flowpath 18 for working medium gases. The flowpath leads to the combustion section and thence to the turbine section. In addition, the compression section has an annular bypass flowpath 22 for working medium gases which conducts an annulus of flow around the core flowpath. The flow rate through the bypass duct can be many times the flow rate through the core flowpath 18. In typical commercial turbofan engines, the flow is five (5) times or greater the flow through the core section of the engine.

The core flow path 18 extends through the engine inwardly of the bypass flowpath 22. As the working medium gases are flowed through the engine, the gases are compressed in the compression section 12. The compressed gases are burned with fuel in the combustion section 14 to add energy to gases and expanded through the turbine section 16 to produce power. As the gases are flowed through the turbine section, rotating elements (not shown) receive energy from the working medium gases. The energy is transferred to the compression section by compressing the incoming gases in both the core and bypass flowpaths. A portion of the energy from the turbine section 16 drives large masses of air through the bypass flowpath 22, usually without adding energy to the gases by burning fuel with the gases. Thus, the gases produce useful thrust as they exit the engine at the rear of the engine and at the rear of the bypass duct.

FIG. 2 is a side elevation view of the engine 10 shown in FIG. 1. The engine is partially broken away to show a portion of the interior of the compression section 28. The engine has a low pressure rotor assembly 24 and a high pressure rotor assembly (not shown). The rotor assemblies extend axially through the engine for transferring energy from the turbine section 16 to the compression section 12. The working medium flow path 18 extends through the rotor assemblies. A stator assembly 26 bounds the flowpath and directs the gases as the gases pass through the stages of the rotor assembles.

The compression section includes a first, low pressure compressor 28. The turbine section 16 includes a low pressure turbine 30. The low pressure turbine is the device used to extract energy from the working medium gases. A shaft 32 connects the turbine section to the low pressure rotor assembly 24 in the low pressure compressor. The shaft is typically called the low shaft. A bearing 34 supports the shaft. Energy is transferred via the rotatable low shaft 32 to the low pressure compressor. The shaft drives the low pressure compressor about the axis of rotation Ar at over three thousand revolutions per minute to transfer energy from the low pressure turbine to the low pressure compressor.

The compression section 12 also includes a high pressure compressor 36. The high pressure compressor receives working medium gases from the exit of the low pressure compressor. The high pressure compressor is connected by a second (high) shaft (not shown) to a high pressure turbine. The high shaft is disposed outwardly of the shaft 32 for the low pressure compressor 28. The high pressure compressor is driven by a high pressure turbine 38 downstream of the combustion section 14. The hot working medium gases are then discharged to the low pressure turbine 30 and drive the low pressure turbine about the axis of rotation Ar.

The low pressure compressor 28 is often referred to as the fan-low compressor. Another example of a fan-low compressor is shown the U.S. Pat. No. 4,199,295 issued to Raffy et al. entitled "Method and Device for Reducing the Noise of Turbo Machines." In Raffy and as shown in FIG. 2, the fan-low compressor has a relatively massive fan rotor disk 42. A plurality of relatively massive fan rotor blades 44 extend radially outwardly from the fan rotor disk across the core flowpath 18 and across the by-pass flowpath 22.

FIG. 2A illustrates the relationship during assembly of the engine of the two main subassemblies: a first subassembly of the fan-low compressor with a fan blade 44 installed and another fan blade being installed; and, a second subassembly that comprises the rest of the engine. The fan rotor blades 44 are axially inserted into the fan rotor disk as one of the last steps of assembling the engine. FIG. 2A shows the engine during the method of assembly as discussed below with at least one fan blade 44 installed and with the next fan blade moving on its path of insertion into the rotor disk.

Each fan blade 44 has a root or dovetail 46 which engages a corresponding slot 48 in the fan rotor disk. Alternatively, the fan blade might be pinned to the rotor disk. The low pressure compressor also includes a drum rotor 50 which is part of the low pressure rotor assembly 24. The drum rotor is so called because of its drum-like shape. The drum rotor extends rearwardly from the fan rotor disk.

As shown in FIG. 3, the drum rotor has dovetail attachment members 52. The members adapt the rotor to receive rotor elements such as a plurality of arrays of rotor blades as represented by the rotor blades 54, 56, 58, 62, 64, and 66. The stator assembly 26 has an interior casing or outer case 68 which extends circumferentially about the rotor assembly. The outer case includes a flow path wall 69 for the bypass flowpath. The rotor blades extend radially outwardly across the working medium flow path 18. Each rotor blade has a tip, as represented by the tips 72, 74, 76, 78, 82. An outer air seal 85 has outer air seal lands 86 which extend circumferentially about the outer case. The outer seal lands are disposed radially outwardly of the arrays of rotor blades to block the loss of working medium gases from the flowpath. These seal lands, generally called "rubstrips", are in close proximity to the rotor assembly 24. A plurality of arrays of stator vanes, as represented by the stator vanes 92, 94, 96, 98, 102 and 104 extend radially inwardly from the outer case into at least close proximity with the drum rotor. Each stator vane has a tip, as represented by the tip 106.

An inner air seal 108 is disposed between the stator vanes 92–104 and the drum rotor 50. Each inner air seal 108 has a seal land 112 which extends circumferentially about the tips 106 of the stator vanes. The seal land is disposed in at least close proximity to the drum rotor. The drum rotor is adapted by rotor elements, as represented by the knife edge seal elements 114, which extend outwardly and cooperate with the seal land to form the inner air seal. The knife edge seal elements have a greater height than width and are relatively thin. The knife edge elements cut into the seal land under operative conditions as the knife edge elements move radially outwardly under operative conditions. An example of such a construction is shown in U.S. Pat. No. 4,257,753 issued to Bradley et al. entitled "Gas Turbine Engine Seal and Method for Making a Gas Turbine Engine Seal." The seal land in Bradley has a thin film surface layer that is resistant to erosion and provides a small amount of wear to the knife edge element. It may be formed of metallic fibers and a silicone based resin.

Another type of material for the seal land 112 is an elastomeric material such as room temperature vulcanizing rubber. One satisfactory material for the inner air seal land is silicone rubber available as DC93-18 silicone rubber from the Dow Corning Corporation 2200 W Salzburg Rd, Auburn, Mich. 48611. A satisfactory material for the outer air seal land 86 (rubstrip) is available as Dow Corning 3-6891 silicone rubber available from Dow Corning Corporation, Midland, Mich. Each silicone rubber is abradable and accepts rubbing contact with rotating structure without destruction.

An assembly clearance and an operative clearance (clearance under operative conditions) are provided between the rotor 24 assembly and stator assembly 26. Examples are the clearances between the rotor blade tips 72–84 and the outer air seal lands 86; between the knife edge elements 114 and the inner air seal land 112 of the stator vanes 92–102; and, between other locations in the engine where rubbing contact might take place between rotating parts and stationary parts in the low pressure compressor and the low pressure turbine.

The assembly clearance provides a radial distance between the rotor elements rotor (blade, knife edge) and the stator assembly to take into account radial tolerances on the rotor disk 42 or drum rotor 50, the blade 44, 92–104, and the seal lands 86, 112. The assembly clearance is necessary to permit initial inspection of the assembly by turning (rotating) the assembly about the axis Ar by hand or at very slow speeds with low force. This inspection ensures that a destructive interference does not occur at some location during normal operations of the engine at high speeds. Such interference might occur between parts of the low pressure compressor 28, between parts of the low pressure turbine 30 and between the low shaft 32 that connects them and other parts of the engine. In addition, the clearance is helpful in assembling the fan rotor blades 44 to the fan rotor disk 42.

During assembly of the gas turbine engine 10, the fan blades 44 are axially inserted into the rotor disk 42. These are inserted one at a time. The rotor disk is turned by hand, bringing the slot 48 receiving the rotor blade to a location where a worker can insert the fan rotor blade while standing in front of the engine or on a small step ladder. However, if the rotor assembly binds, the worker must climb a taller ladder and maintain his balance while maneuvering the very heavy fan blade (sometimes weighing in excess of twenty pounds) into some of the higher oriented slots. As a result, workers will try to force the rotor to turn or request that engine be disassembled and reassembled with more clearance. Sometimes a torque in excess of one thousand foot pounds force (1000 ft-lbf) is required to turn the rotor assembly during assembly of the engine. Such a torque may bend the delicate tips 72–84 of the rotor blades 54–66. Accordingly, a too tight nominal clearance or tight minimum clearance dimension might cause a rotor blade to contact a rubstrip and cause bending of the tip of the rotor blade as attempts are made to rotate the compressor by hand. Too tight a clearance might also decrease engine performance by causing the rotor blades to rip out a rub strip under operative conditions, liberating material which might impact downstream components.

These assembly clearances, if too large, may adversely effect the efficiency of the engine particularly the efficiency of the compressor 28. If too large, the clearance at operative conditions may not close at the cruise condition leaving a gap. The gap of concern is between the rotor element and the adjacent surface of the seal land before and after the rotor element. A gap caused by a rub of the rotor element surprisingly has a small effect on aerodynamic performance. However, a gap with respect to the adjacent structure might create a leak path between the rotor assembly 24 and the compressor, such as between the blade tips and the rubstrip and between the knife edges of the drum rotor and the adjacent seal land carried by the tips of the stator vanes. The gap at cruise provides an escape path for the working medium gases around the rotor blades. The gap at cruise is a concern because the engine may spend a significant amount of time at the cruise condition during long flights.

The nominal clearance at assembly is set within a tolerance band (permitted variation) that trades off the need for aerodynamic efficiency against the need for an acceptable assembly clearance; one that facilitates building the rotor assembly by being able to rotate the rotor assembly 24 by hand at very low speeds during fabrication. Accordingly, the nominal clearance at assembly with its tolerance band sets a radial zone of locations for the rotor elements that avoids too tight or too large clearances. For example, for a rotor blade 54, the nominal value of the clearance might be one-hundred and seventy two (172) mils plus or minus twenty-five mils, that is, with a tolerance band from a maximum clearance dimension of one hundred and ninety seven (197) mils to a minimum clearance dimension of one-hundred and forty seven (147) mils. This radial zone of rotor locations may be applied to an element rotating at over three thousand (3000) revolutions per minute at a four foot diameter.

The radial position of the tolerance band at assembly (nominal assembly clearance) must take into account not only assembly and operative aerodynamic considerations, but also the average diameter Dav of the outer case (e.g. outer seal land 86) at a particular axial location. Typically, the stacking line S for the rotor blades in the assembled as the axial location at the outer air seal for measuring the average diameter of the seal land. (The stacking line S is the spanwise reference line on which the chordwise extending airfoil sections are disposed perpendicular to the stacking line to define the contour of the rotor blade. The average diameter for the seal land is determined by first measuring the circumference of the seal land at that location and then dividing the circumference by $\pi$ (Dav=C/$\pi$). The value must fall within acceptable limits. There is no factor in the average diameter for any anomalies in the outer case (seal lands 86, 112) which may occur outside these limits as a result of further processing during assembly. These are tolerated because the case is large (often over four feet in diameter) with acceptable limits for the average diameter Dav lying within a range of hundredths of an inch.

The matter is further complicated because drum rotors 50 require further processing which includes an axial extending parting line or split in the outer case. The parting line allows the two halves (or more parts if not cut in half in a longitudinal direction) to be bolted together about the drum rotor to dispose the outer seal lands 86 and the inner seal lands 112 about the rotor elements. Accordingly, the average diameter of the seal land is measured as discussed above (Dav=C/π) prior to cutting the outer case with the rubstrip installed. There are many other approaches for measuring the average diameter Dav at the stacking line. These include using a coordinate measurement machine. The measurement machine measures the diameter at many locations around the circumference at a particular axial location. These measurements are then averaged.

The outer case in many applications is several feet in diameter and may be as thin as one hundred and fifty (150) mils and formed of an aluminum alloy such as Aerospace Materials Specification (AMS) 4312. When the case is reassembled from its component parts some additional circumferential anomalies may be introduced in the installed condition by the flanges on the case.

As a result, gas turbine engines are not built with too tight clearances because the rotor, such as a drum rotor 50, cannot be rotated at assembly. As the prototype engines are built, the rotor is rotated and often the tolerances are increased. A positive minimum clearance dimension is always provided for those rotor blades 54, 56, 58 that grow radially outwardly and rub against the rubstrip while attempting to set the nominal (average) clearance dimension to arrive at a line on line clearance (zero clearance) at the cruise condition.

The arrays of rotor blades 62, 64, 66 in the rear of the compressor adjacent a rapidly converging flow path are different. It has been observed that one or more of these arrays of rotor blades do not tend to rub at the cruise operative condition. These rotor blades have a positive nominal clearance dimension with a minimum clearance dimension that is zero as measured at the stacking line; and with a maximum clearance dimension that is greater than thirty (30) mils in one application.

The rotor blade 66 may have a tip 70 which extends rearwardly (chordwisely) at about the same angle as the rubstrip. However, it is angled slightly inwardly in the spanwise directions to provide a taper in the event of a rub. A rub, which might occur at an extreme Sea Level Take Off operative condition, would cause the tapered tip to cut a trench in the rubstrip that is tapered rearwardly with decreasing depth. This taper is provided for aerodynamic reasons. As a result, the forward most portion of the rotor blade 66 at the minimum zero tolerance dimension might have an interference fit of about one to two mils (0.001–0.002 inches). This slight interference fit is accommodated somewhat by the rotor blades being able to lean slightly in the circumferential direction as a result of assembly tolerances at the base of the rotor blade where the dove tail engages the rotor 50. Thus, as the rotor is turned by hand, the blade will slide along the rubstrip at the average diameter Dav of the rubstrip.

The knife edge seal projections or elements 114 are a third category. These are provided with a minimum clearance and a nominal clearance that is smaller than the forward rotor blades 54, 56, 58 but insures that the knife edges cut a groove under operative conditions and run in the groove in the cruise operative condition on the seal land that each knife edge engages.

In summary, there is tension between the need to minimize the aerodynamic clearance in the cruise operative condition of the engine and the need to be able to assemble and inspect the low pressure compressor and low pressure turbine assembly. The matter is further complicated in that the outer case, having an average diameter, is not a true circle at any axial location but has anomalies that extend inwardly at some locations. In short, if it is difficult to rotate the rotor by hand, the solution is to open the clearance by increasing the minimum clearance dimension or the nominal clearance dimension to increase the clearance and allow the rotor to turn more freely. However, this is accompanied by a decrease in aerodynamic efficiency.

The above art notwithstanding, scientists and engineers working under the direction of Applicants Assignee are seeking to address the twin needs of being able to rotate the low pressure compressor-low turbine rotor assembly during buildup while maintaining clearances that are acceptable for aerodynamic performance.

SUMMARY

This invention is in part predicated on the recognition that applying a lubricating substance at assembly to the surface of a seal land reduces the frictional force resulting from rotational contact between the rotor assembly and the stator assembly of the low pressure compressor during assembly to such an extent that the low pressure compressor may be readily turned by hand even with a zero minimum clearance in the rear stages of the compressor and does not degrade the performance of the components with which the lubricant comes in contact.

According to the present invention, a method of assembling a rotary machine includes applying a lubricant to the surface of a circumferentially extending seal land for the rotor assembly and stator assembly to reduce friction at assembly between the seal land and the adjacent structure as the rotor assembly is turned during assembly.

In accordance with the present invention, the method includes forming a subassembly which includes the low compressor rotor assembly; forming a case assembly for the low compressor rotor assembly; and applying a lubricant to at least one seal land prior to assembling the case assembly to the rotor assembly.

In accordance with one embodiment of the present invention, the method includes disposing the rotor assembly such that at least one rotor element has an interference fit with the seal land over a portion of the circumference of the seal land; and, rotating the rotor assembly to axially insert one fan rotor blade after another fan rotor blade into the rotor assembly.

In accordance with one embodiment of the present invention, the method includes disposing a lubricant on an inner seal land and having an interference fit between the inner seal land and the adjacent knife edge over a portion of the circumference of the seal land which is greater than fifteen (15) mils.

In accordance with one embodiment of the present invention, the step of disposing the fan rotor blades in the rotor assembly includes applying a torque to the rotor assembly to turn the rotor assembly to bring the fan blade slot into a position convenient for inserting the fan blade, with a torque that is less than forty foot pounds force (40 ft-lbf).

A primary feature of the present invention is the step of disposing a lubricant on a seal land. In one embodiment, the seal land is elastomeric. Another feature is allowing the lubricant to remain on the seal land for a period of time that exceeds several days. Another feature is applying a low torque to turn the rotor assembly even though at least one rotor blade or element has an interference fit with the seal land.

A primary advantage of the present invention is the speed and efficiency with which a gas turbine engine may be assembled and which results from decreasing frictional forces between the rotor assembly and the stator assembly. Another advantage is the flexibility in assembling the engine which results from installing the outer case after disposing lubricant on the rotor land and then being able to delay assembling the fan blades for at least several days because the lubricant on the elastomeric seal materials does not lose the ability to reduce friction during the delay. Still another advantage is the structural integrity of the gas turbine engine which results form the benign interaction between the lubricant and the surface of the seal land.

The foregoing features and advantages of the present invention will become more apparent in light of the following detailed description of the invention and the accompanying drawings.

DETAILED DESCRIPTION OF THE INVENTION

Figure 1:
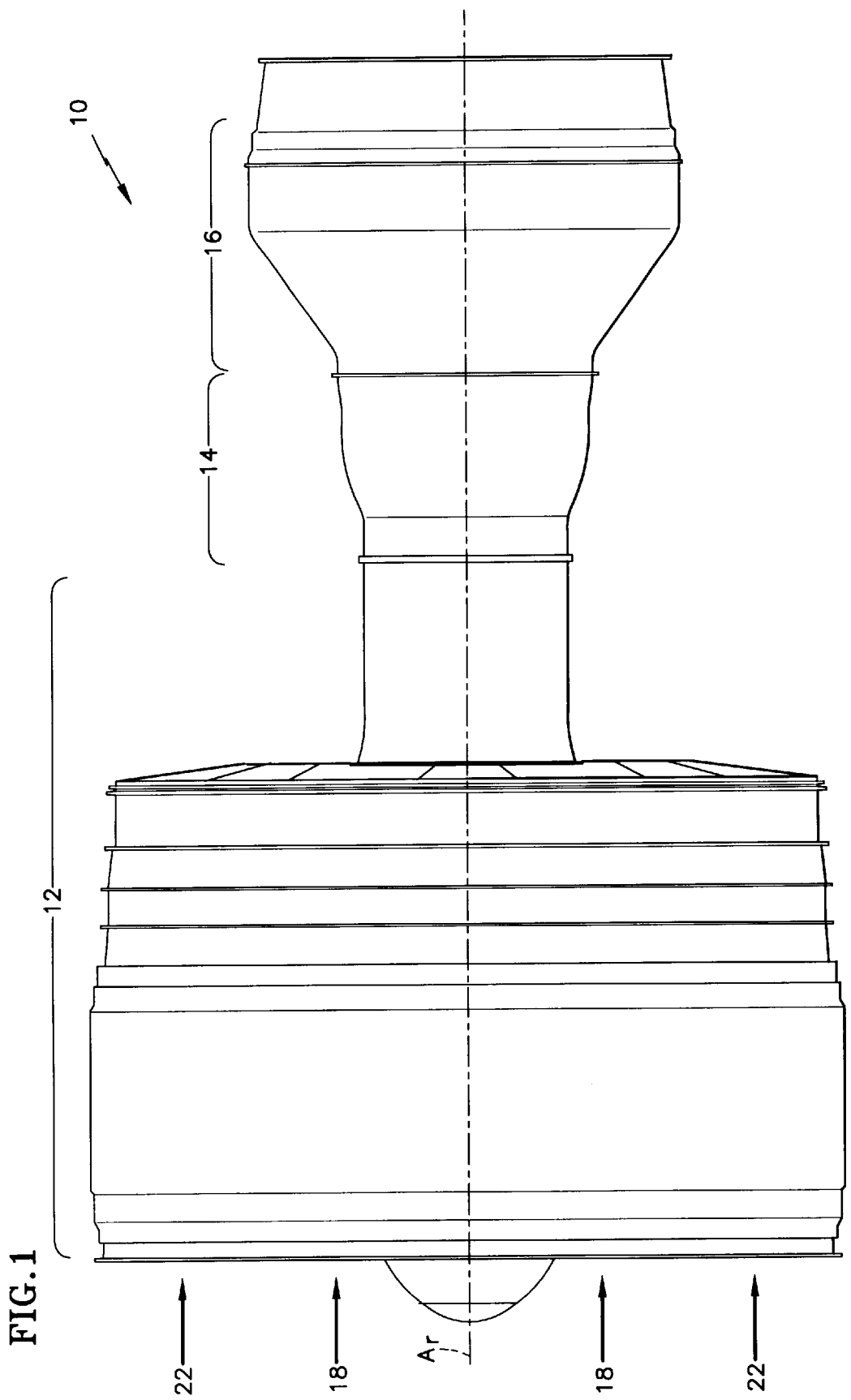
FIG. 1 is a side elevation view of an axial flow rotary machine as represented by the high bypass ratio turbofan gas turbine engine 10.
Figure 2:
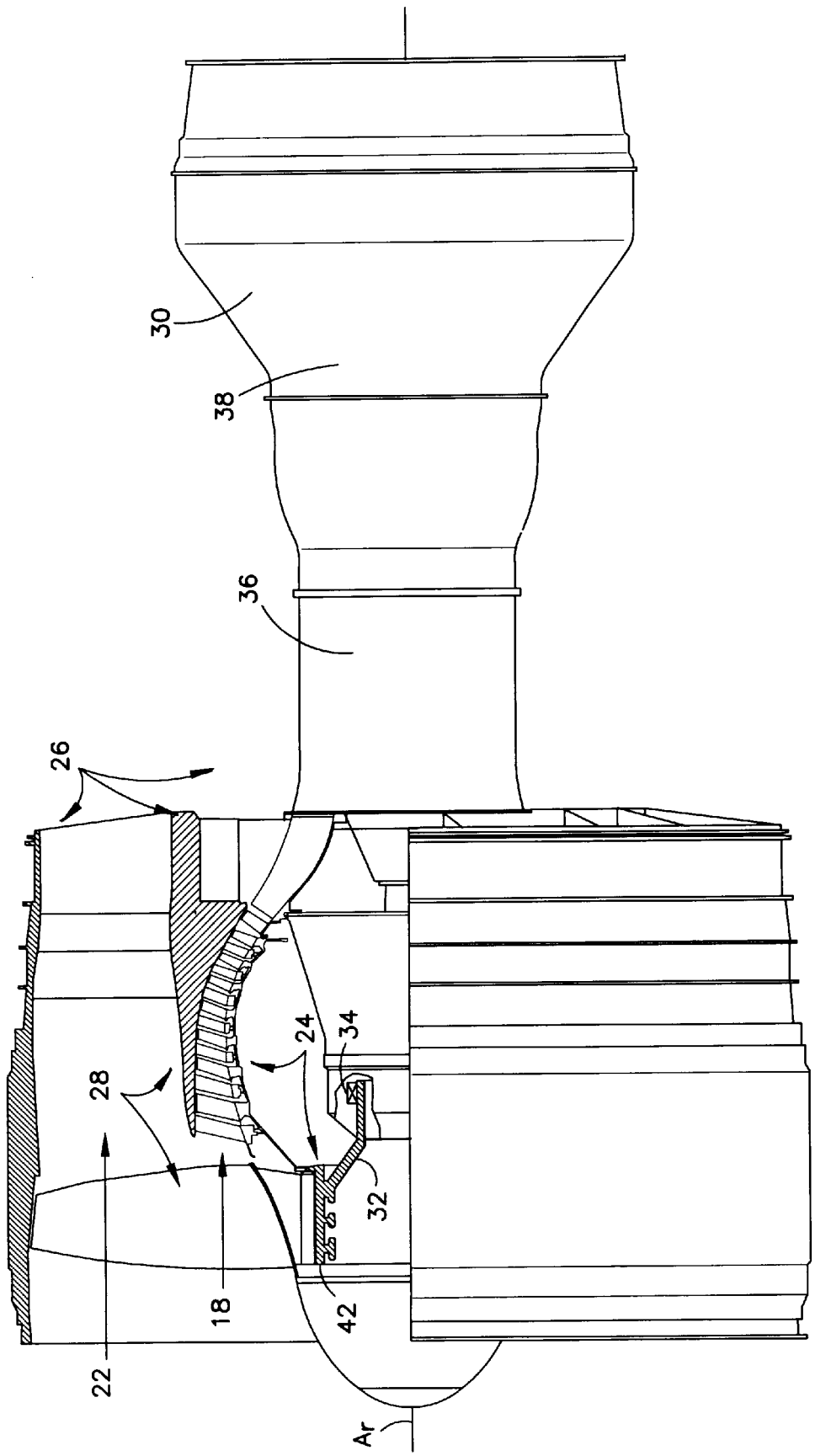
FIG. 2 is a side elevation view of the gas turbine engine shown in FIG. 1 with a portion of the fan case and other engine structure broken away to show a portion of the compression section partially sectioned and partially in full.
Figure 2A:
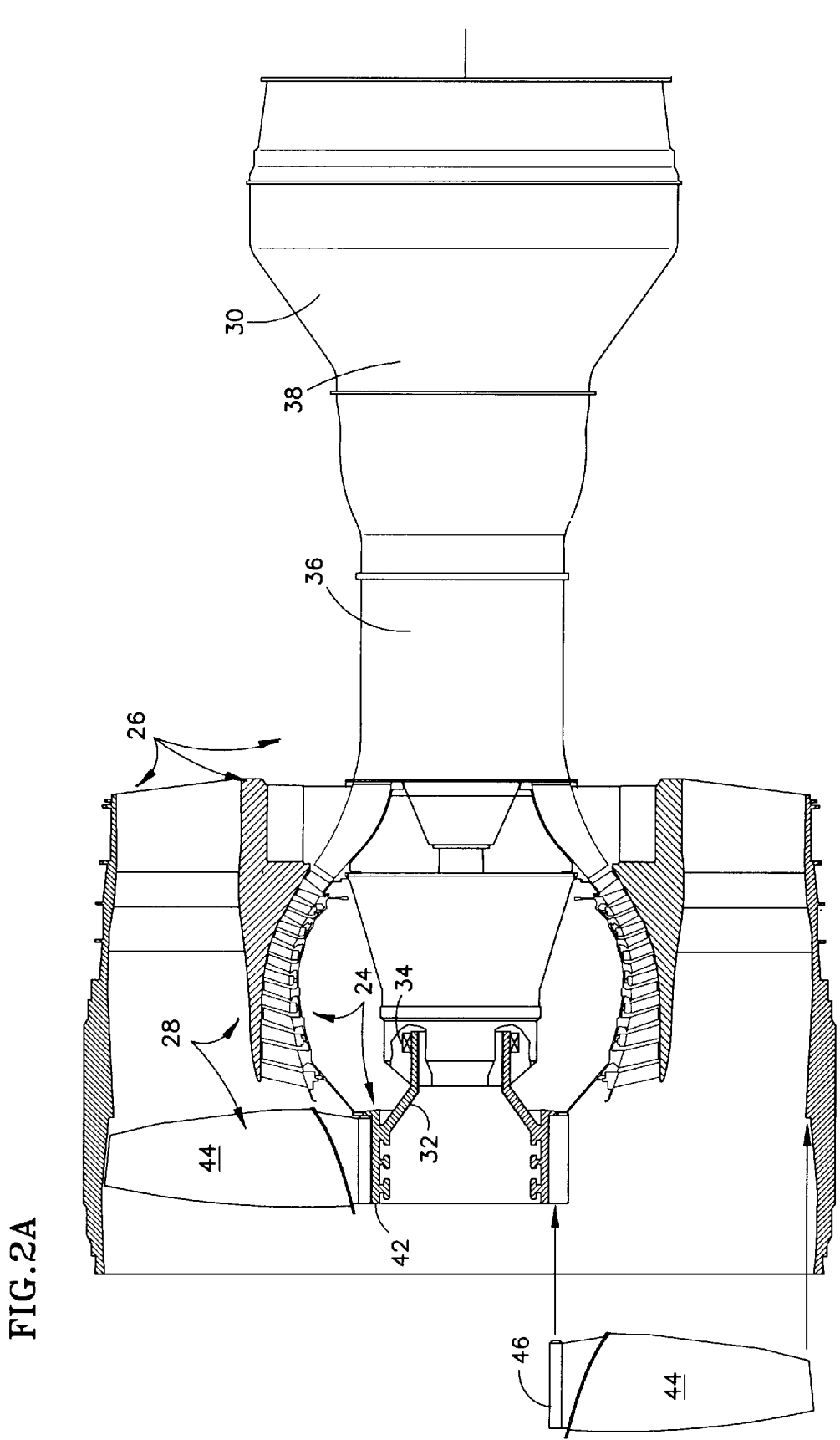
FIG. 2A is a side elevation view corresponding to the view shown in FIG. 2 illustrating the relationship during assembly of the fan low compressor subassembly during insertion of fan blades and a second subassembly that comprises the rest of the engine.

As shown in the FIG. 1 and FIG. 2 side elevation views of the turbofan gas turbine engine, the fan portion of the low pressure compressor has a large diameter fan case 112. The fan case extends about the assembly of the fan rotor disk 42 and fan rotor blades 44. During buildup, the engine 10 is disposed in a fixture for supporting the engine or suspended above the floor. The height of the engine above the floor at the top of the engine can be as much as ten (10) to twelve (12) feet.

Figure 3:
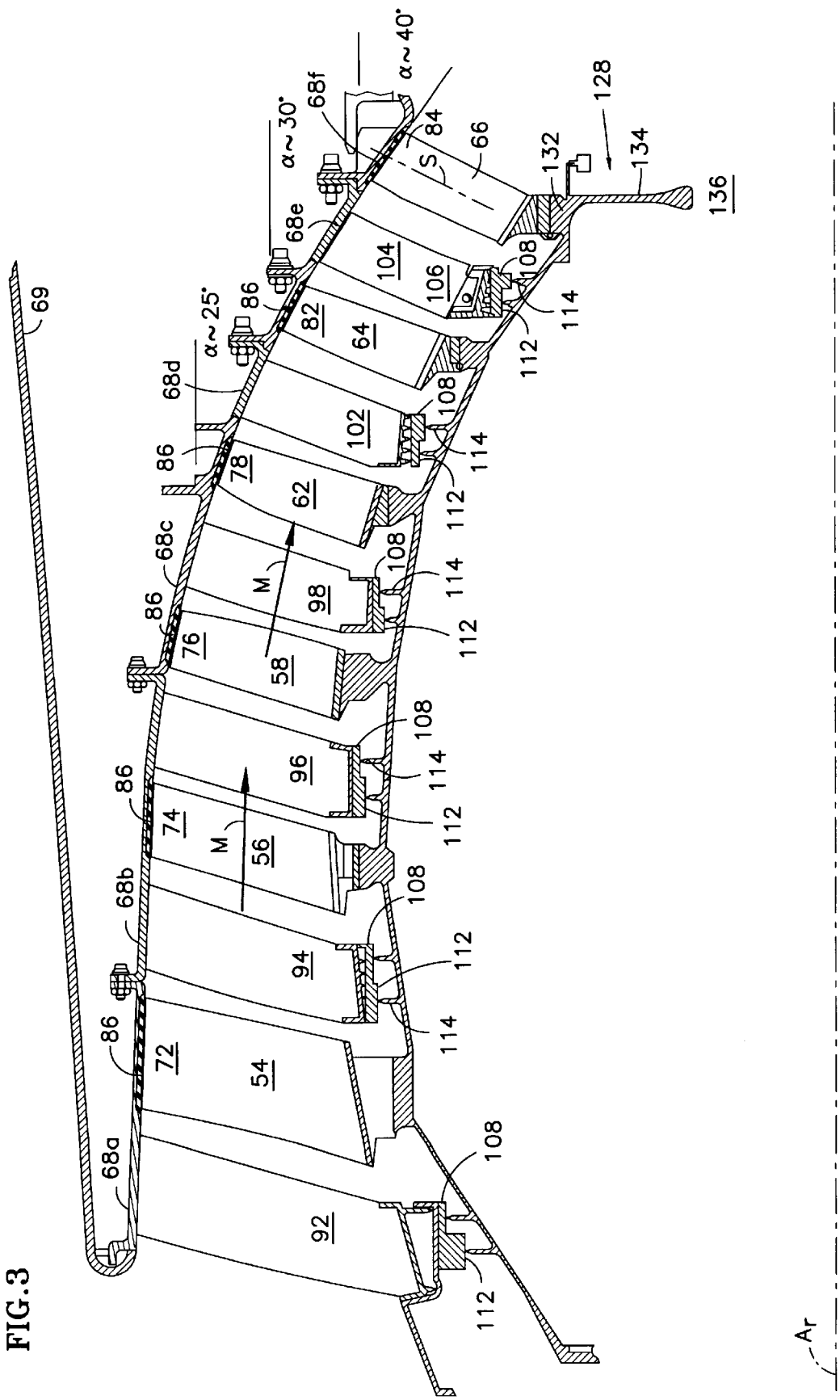
FIG. 3 is an enlarged view of the rotor assembly and stator assembly for the compression section shown in FIG. 2.

FIG. 3 shows a portion of a stator assembly and rotor assembly, as represented by the low pressure rotor assembly 24 shown in FIG. 2. Many other types of stator and rotor assemblies might be formed, each having at least two rotor elements, such as rotor blades and knife edges and having seal lands for the rotor elements. In FIG. 3, the fan rotor disk 42 and the bearing 34 supporting the fan rotor disk are broken away for clarity. The core flowpath 18 for working medium gases has a mean flow line M in the low pressure compressor 28. The mean flowpath line is approximately midway between the drum rotor 50 and the interior case 68 of the engine (commonly referred to as the outer case). The flow path converges radially inwardly in the axial direction with a negative slope with respect to the axial direction. The absolute value of the negative slope is greater in the aft region of the compressor than in the mid region of the compressor. The rubstrips 86 adjacent the rearmost rotor blades 62, 64, 66 are angled inwardly at an angle greater than 15° toward the axis of rotation Ar and in the spanwise direction. The rubstrips form a frustoconical surface which extends circumferentially about the axis rotation $A_r$ of the engine. For example the rubstrip adjacent blade 62 has about a twenty five degree (25°) slope angle ($\alpha=25°$) adjacent blade 64 when intersected by a radial plane containing the axis of rotation Ar. The rubstrip has approximately a thirty degree slope (angle $\alpha=30°$) and the rubstrip at the rearmost stage adjacent blade 66 has approximately a forty degree slope (angle $\alpha=40°$).

Figure 4:
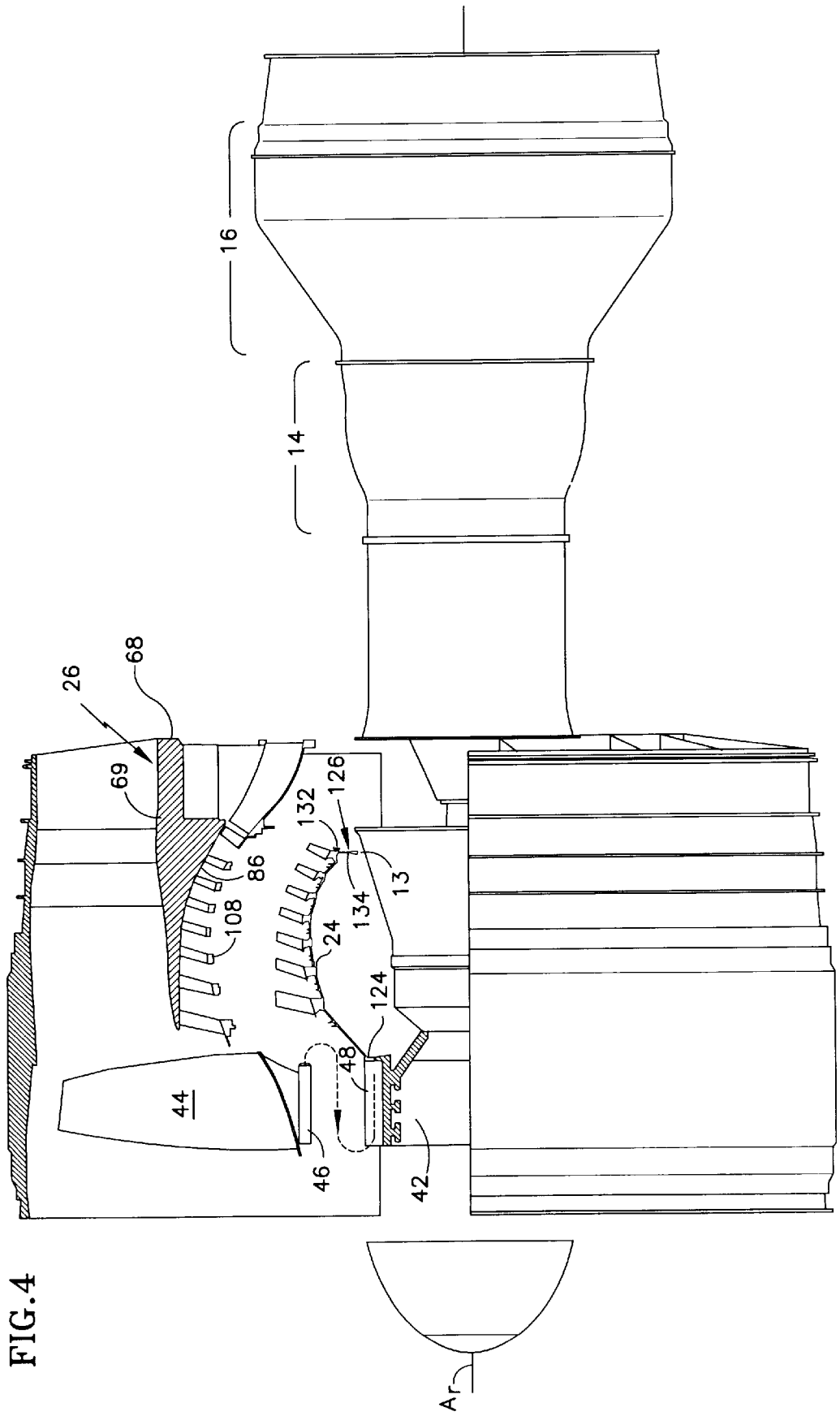
FIG. 4 is a side elevation exploded view of a portion of the compression section of a gas turbine engine showing the relationship of the two halves of the outer case and the stator assembly to the rotor assembly and to the fan blades for the rotor assembly.

FIG. 4 is an exploded schematic view of the engine shown in FIGS. 1–3. The drum rotor 50 extends rearwardly from the fan rotor disk 42. The drum rotor has a first end 124 which is attached to the fan rotor disk to support the drum rotor from the fan rotor disk. The drum rotor has a second end 126 spaced rearwardly from the first end. The second end has a rearmost rotor disk 128 which includes a rim 132, a web 134, and a bore 136. The bore is spaced radially from the rim by the web. Thus, the drum rotor is fixed at one end and is free to move in the axial direction in response to rotational forces at the other, second end and is constrained against radial movement by the rearmost disk.

The drum rotor has the arrays of rotor blades 54–66. The arrays extend outwardly in a generally radial direction. As used herein the term "radial direction" includes the direction in which the rearmost blades extend which is a direction that is substantially radial.

The stator assembly 26 has the rubstrips 86 which are disposed radially outwardly from each of the arrays of rotor blades. As mentioned, the rubstrips are formed of elastomeric material and have an average diameter Dav in the non-operative condition at the axial location that coincides with the intersection of the stacking lines of the rotor blade with the rubstrip in the non-operative condition. The rubstrips 86 extend rearwardly at about the same angle as the tips 70–82 of the rotor blade. The tips, as mentioned earlier, might be tapered slightly rearwardly in the spanwise direction to cut a tapered trench upon a rub.

The stator assembly 26 includes the outer case 68. The outer case is formed from sections (68a, 68b, 68c, 68d, 68e, 68f) of circumferentially continuous structure. Each section is split longitudinally into at least two axially and circumferentially extending portions. As shown in FIG. 3, the axial sections are bolted together axially and circumferentially to join the halves of the outer case. The flanges on the sections coupled with the relatively large diameter and thinness of the structure cause small anomalies in the roundness (or concentricity) of the outer case. As a result, the case supports and positions the rub strips in such a way that the rubstrip is not a perfect circle at the first axial location.

The rotor blades are is formed of AMS 4928 titanium alloy. The drum rotor 62 is also formed of a material having the same composition as AMS4928 titanium alloy but the drum rotor has been heat treated to have a slightly different material structure. The outer case material is formed of AMS 4312 aluminum alloy. The coefficient of thermal expansion for the outer case material is greater that the coefficient of thermal expansion for the rotor disk and rotor blades and for some material may be as much as two to three times greater than the thermal coefficient of expansion for the drum rotor and rotor blades.

FIG. 4 is helpful in understanding the method of assembling the gas turbine engine shown in FIG. 1 and FIG. 2. A first engine subassembly is formed which is adapted to receive the outer case and will include the outer case after the outer case is installed. The first engine subassembly is shown oriented to receive the outer case. The first engine subassembly includes only part of the low compressor portion of the low pressure rotor assembly (e.g. fan rotor disk, bearing, drum rotor, and rotor blades). It does not include the fan blades and the outer case. At this point, it does not include a second subassembly that exists or will exist that is formed of the fan case, fan struts 123 (partially broken away), high pressure compressor, combustion section 14 and turbine section 16. These are installed later. (The second subassembly is shown in FIG. 2 with respect to the first engine subassembly with the outer case installed and the fan blades being installed.) Returning to FIG. 4, the fan rotor blades are shown exploded away from fan rotor disk and axially positioned above the fan rotor disk for purposes of illustration.

The next step is to dispose a lubricant on one of the seal lands, such as the inner seal lands 112 or on the surface of one of the outer air seal lands 86 (rubstrips) of the low pressure compressor 28. In one embodiment, a lubricant was disposed on the surface of all the inner air seal lands and on the surfaces of the two rearmost, outer air seal lands that are adjacent to rotor blades 64, 66. The seal lands are formed of silicone rubber.

One satisfactory lubricant is silicone oil. One acceptable oil is KF-54 Silicone Oil available from the Shin Etsu Company LTD Tokyo, Japan having offices at 1150 Davmar Drive, Akron, Ohio 44305. This oil was found compatible with the titanium alloy of the drum rotor, the titanium alloy of the blades, the aluminum alloy of the outer case and with the silicone rubber of the outer air seal. The viscosity of the oil is about two hundred (200) centipoise at room temperature and pressure.

The next step is disposing the two halves of the outer case 68 about the first engine subassembly and includes joining the two halves together with bolts. Each of the seal lands has an average diameter Dav at the associated first axial location at the stacking line S. The rotor element has a tolerance band having a minimum and maximum clearance dimension about the nominal clearance dimension as measured with respect to the average diameter Dav. This defines the relative radial position of each seal land with respect to the rotor assembly. Even with a zero minimum clearance dimension or with a positive minimum clearance dimension, there will be rubbing contact over at least a portion of the circumferential travel of a rotor element 54–66, 114 because of deviations in roundness or concentricity in the seal land. Examples of rubbing contact might occur with one of the knife edge elements 114 or with one of the rotor blades such as the rearmost rotor blade 66 because of anomalies in the circumference of the case.

Some time may pass before the first engine subassembly is ready to join the second engine subassembly and then to receive the large rotor blades. For example, the flowpath wall 69 might be part of the first engine subassembly at the time the outer case 68a–f is disposed about the rotor assembly or it may be added after disposing the two halves of the outer case about the rotor assembly. Joining the two subassemblies together readies the engine as shown in FIG. 2 to receive the fan rotor blades. Joining the two subassemblies together does not form part of this invention. It may be done prior to the fan blades being installed or after the fan blades are installed.

As much as two weeks may pass while these other operations are performed on the engine or as the engine awaits the necessary parts or connections to other modules. Accordingly, an advantage of the present invention is the flexibility in time of assembly which results from being able to accept a delay of many days prior to assembling the fan rotor blades to the fan rotor disk. It is related to the viscosity of the lubricant which keeps the lubricant distributed about the seal lands.

The step of installing the fan blades is most easily performed by rotating the low pressure rotor assembly 24 about the axis of rotation to bring the slot of the fan rotor blade to a convenient location. This occurs by applying a torque of less than one hundred foot pounds force (100 ft-lbf) to the rotor assembly. The clearances and anomalies in the diameter of the seal lands have made it difficult to rotate a rotor assembly that engages an unlubricated seal land. This is especially so if the land happens to have an anomaly or tolerance variation that causes a tight actual clearance. On some occasions, torques of over a one thousand foot pounds force (1000 ft-lbf) or even greater have been encountered and have been decreased to less than one hundred foot pounds force (100 ft-lbf) in subsequent trials with lubricant applied to the surfaces of the seal lands.

The fan rotor blades 44 are inserted one at a time during the step of assembling the fan rotor blades to the rotor assembly. The method includes rotating the low pressure rotor assembly 24 about the axis of rotation Ar by applying a torque of less than one hundred foot pounds force (100 ft-lbf) to the rotor assembly. This is a marked reduction from the torque required to rotate an unlubricated assembly. The step is repeated time after time until all fan rotor blades are assembled to the fan rotor disk 42.

Figure 5:
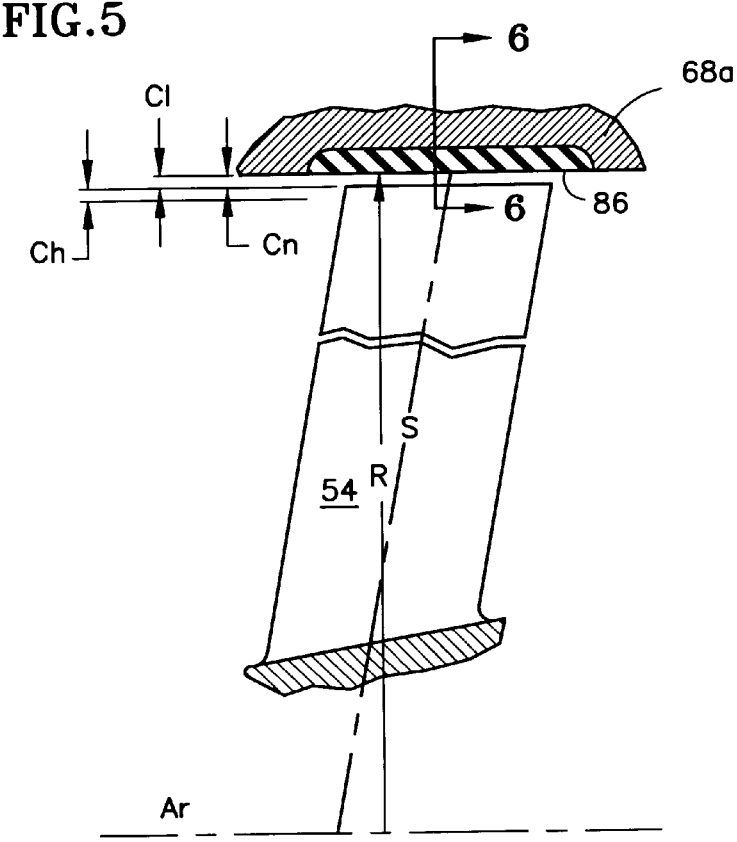
FIG. 5 is a side elevation view of a rotor blade and a circumferentially extending seal land from a rotor blade in the forward portion of the rotor assembly of a low pressure compressor.

FIG. 5 is an enlarged view of one of the rotor blades and an outer seal land at the average diameter Dav of the seal land. Clearances are measured in the true radial direction perpendicular to the ideal axis of rotation Ar of the engine. For example in the field with a rotor blade, clearances are measured by direct comparison. For a rotor blade, the clearance is measured along the stacking line and is then calculated through the angle of the stacking line to the true value along a line R in the radial direction perpendicular to the ideal axis of rotation $A_r$. The line R passes through the intersection of the stacking line S and the tip.

As shown in greatly exaggerated fashion in the assembly condition, the blade tip location has a tolerance applied to the rotor blade which has a nominal clearance dimension Cn, a positive minimum clearance dimension Cl, and a maximum clearance dimension Ch. The minimum clearance dimension Cl is positive, that is, ideally there is a clearance space or gap at the minimum clearance dimension between the blade tip and the average diameter Dav of the outer air seal land 86. During operation, the rotor blade will cut a groove or trench in the outer air seal land. The groove does not decrease aerodynamic performance at the cruise condition to the extent that a positive clearance decreases aerodynamic performance.

Figure 6:
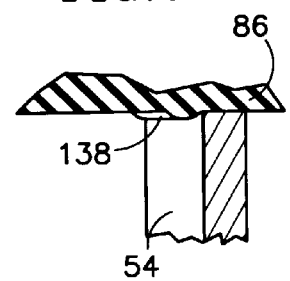
FIG. 6 is a view taken along the line 6—6 of FIG. 5.

As shown in FIG. 6, a too tight clearance Cl or an anomaly in diameter may catch the rotor blade 54. Catching the rotor blade may cause the rotor blade to create a ridge of material 138 in the outer seal land 86 which acts as a barrier to rotational movement in the rotor blade. In one experimental trial, a rotor blade having a ten mil interference fit (Cl=−0.010 inches) with the rearmost rotor stage 66 experienced bending of the tip 84 of the rotor blade at the delicate trailing edge. In another experimental trial, silicone oil was applied to the seal land 86 and new blades having the ten mil interference fit blades were installed. The blades did not bend and the drum rotor turned relatively easily with respect to the seal land.

Figure 7:
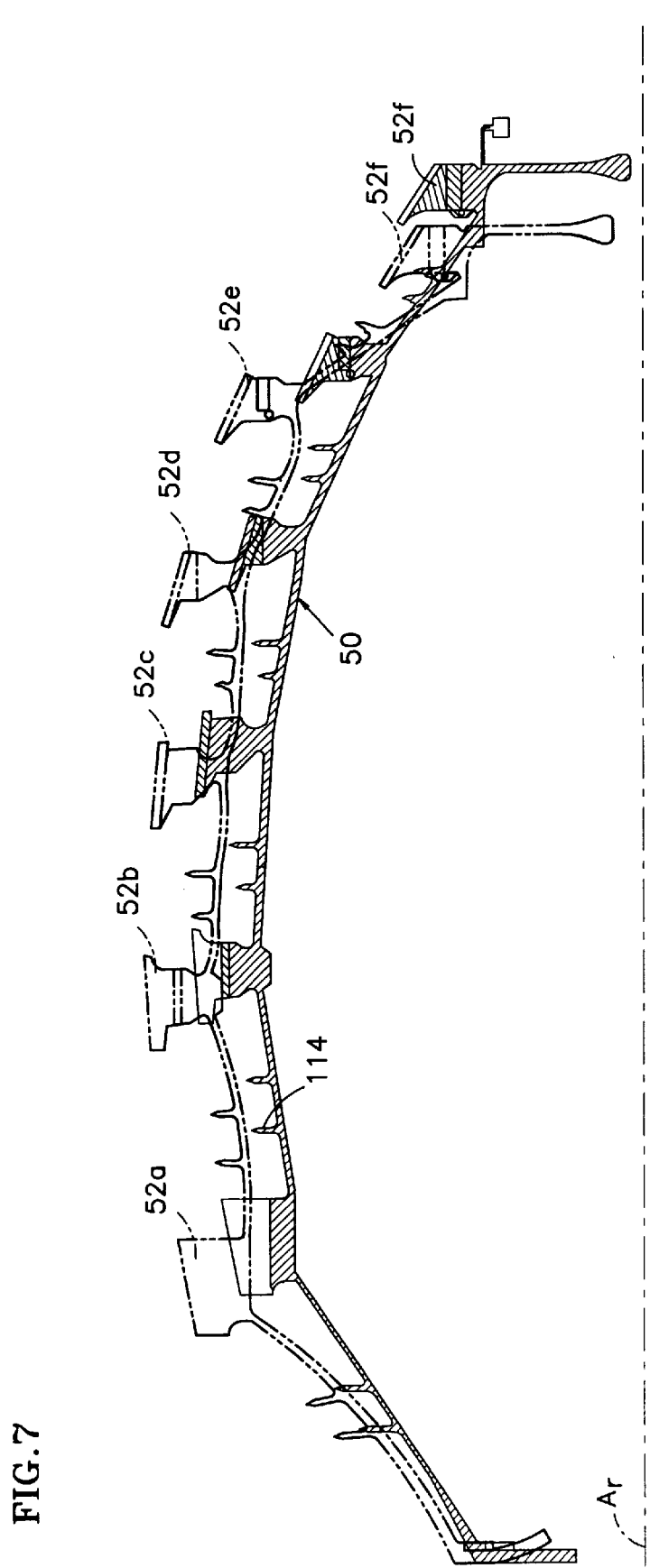
FIG. 7 is schematic representation of the rotor assembly shown in FIG. 4 in a non-operative (static) condition in full and in the operative (dynamic) condition in phantom running at over three thousand revolutions per minute.

FIG. 7 is a schematic representation of movement of the drum rotor 50 shown in FIG. 3 in the static non-operative condition and the dynamic cruise operative condition. The static position is shown in full. The deflected position during rotation at cruise is shown in greatly exaggerated fashion by phantom lines. The drum rotor 50 deflects outwardly under the severe rotational forces that result from rotating the rotor at over three thousand revolutions per minute. This outward movement or growth causes axial (lateral) contraction related in part to axial stresses the Poisson Contraction Effect (Poisson's Ratio). The first end 124 of the drum rotor is fixed to the rotor disk and moves as does the massive fan rotor disk to which it is firmly attached. The relatively heavy dovetail attachments of the drum rotor engage the base of the rotor blades. The dovetail attachment members 52 move outwardly. The rear dovetail attachment members move forwardly as a result of the axial contraction. The relatively thin material of the drum rotor extending between the dovetail attachments deflects outwardly at the ends. The rearmost rotor disk 128 restrains the second end against radial outward movement. As a result, the second end of the drum rotor moves axially forwardly more than it moves radially outwardly, opening the clearance of the rearmost arrays of rotor blade tips with the rubstrip.

Figure 8:
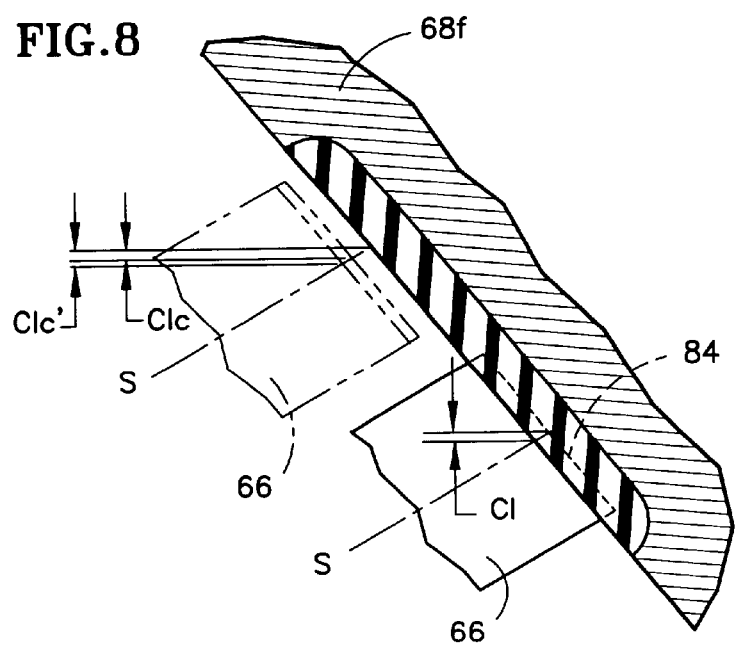
FIG. 8 is a side elevation view in schematic fashion of a rearmost rotor blade and outer air seal (rubstrip) from the aft end of the low pressure compressor.

FIG. 8 is a schematic representation of the relationship of the tip of the rearmost rotor blade to the rubstrip. The blade tip is shown in full and the moved position is shown by the phantom lines at the minimum clearance dimension Cl. The moved position of the rubstrip, which moves outwardly, is not shown. A minimum clearance dimension of zero at the stacking line results in a minimum clearance dimension at cruises which is positive, allowing working medium gases to escape around the tips of the rotor blades. Setting the minimum clearance dimension at an interference fit of ten mils (Cl=−0.010inches) or greater at the stacking line and lubricating the rearmost rubstrip with silicone oil, allows the rotor blade to be turned by hand during assembly and yet as the clearance opens up, the minimum clearance dimension Clc at the cruise operative condition might be still negative. If positive at the cruise condition as shown, the minimum clearance dimension Clc is still smaller than the minimum clearance dimension Clc' if the initial assembly minimum clearance dimension was zero shown by the dotted line in the moved position or, even worse, if it were a positive minimum clearance dimension not having an interference fit at assembly. This will greatly increase the efficiency of the array of rotor blades and the operational efficiency of the compressor.

Lubricating the inner air seal lands will further reduce frictional forces at assembly. This saving in frictional force may be used to tighten nominal assembly clearances further without making it impossible to rotate the drum rotor 50. However, care must be taken that the frictional force at the rearmost seal land does not deform the rotor blade during assembly. Accordingly, it may be possible to reduce the clearance at the rearmost seal land without lubricating that particular seal land. Another way to decrease the friction of the inner air seal lands would be to run the engine with relatively short blades at the rearmost stage, and run in the knife edge elements to the inner air seal lands. Thereafter, the engine would be disassembled and reassembled with longer rotor blades in the rearmost disk.

Accordingly, the use of the silicone oil can permit clearances that provide for a minimum clearance dimension that is negative during assembly to such an extent that the rotor blade has a minimum negative clearance across the entire tip of the rotor blade in the chordwise direction.

Experimental trials were run to demonstrate the compatibility of the silicone oil to the structure of the engine. For example, the engine was found to rotate freely after assembly by applying the silicone oil to the seal land for a pilot lot of blades which normally would cause difficulty in rotating the engine by hand. After testing the engine was torn down for inspection. No trace of residual oil was found on any of the applied surfaces and all rub surfaces appeared normal. Oil residue did tend to collect fine rubber particles generated during the initial rub on some stages, such as the inner air seals. The blade tips collected trace amounts of fine silica (which are also typical after non-lubricated initial rub events. These were left over after the oil evaporated at the elevated temperatures of the flow path during the operative conditions of testing.

The silicone rubber was checked through a fluid exposure test in which durometer readings were taken and found unchanged after periods which demonstrated the compatibility of the silicone oil with the silicone rubber. In addition, the silicone oil and the residue was compatible with the titanium alloy of the low pressure compressor and of the high pressure compressor.

Although the invention has been shown and described with respect to detailed embodiments thereof, it should be understood by those skilled in the art that various changes in form and detail may be made without departing from the spirit and scope of the claimed invention.

We claim:

1. A method of assembling a rotary machine having an axis of rotation Ar and a flow path for working medium gases which extends through the machine, the machine having in the assembled condition a rotor assembly which rotates in the circumferential direction about the axis Ar during assembly and under operative conditions, and having a stator assembly which circumscribes the rotor assembly, each assembly extending through at least a portion of the engine to bound the flow path, each assembly having arrays of airfoils extending radially across the flow path into close proximity with the other assembly, one of said assemblies having a first element and the other having a first seal land associated with the first element which extends circumferentially about the axis Ar and circumferentially with respect to the first element and in at least close proximity to said other assembly with a tolerance band, as measured at an axial location with respect to the average diameter Dav of the seal land in the non-operative condition, for blocking the flow of working medium gases from the flowpath under operative conditions, comprising:

applying a lubricant to a surface of the first seal land which extends circumferentially about the engine;

disposing the first seal land relative to the first element which includes radially orienting the seal land with respect to the first element such that a tolerance band having a minimum clearance dimension and a maximum clearance dimension defines the relative radial position of the first seal land and the first element at an axial location, with respect to the average diameter Dav of the seal land at that location in the non-operative condition;

radially engaging the seal land with at least a portion of the first element such that an interference fit exists between the seal land and the first element during assembly over at least a portion of the circumferential travel of the rotor element;

rotating the rotor assembly during assembly with respect to the stator assembly by applying a turning moment to the rotor assembly which is smaller than the turning moment required to rotate a rotor assembly having no lubricant.

2. The method of assembling a rotary machine of claim 1 wherein the stator assembly and the rotor assembly extend axially through the engine about an axis of rotation, and wherein the first element is part of the rotor assembly and is a first rotor element extending in a generally radial direction with respect to the axis of rotation, wherein the stator assembly has the first seal land, and wherein the step of radially engaging the seal land with at least a portion of the first element includes radially engaging the seal land on the stator assembly with the rotor assembly.

3. The method of assembling the rotary machine of claim 2 wherein the rotary machine includes an outer case having the first seal land and further includes an engine subassembly which includes as part of the rotor assembly a fan rotor disk which is adapted to receive a plurality of fan rotor blades, wherein the step of disposing the first seal land relative to the first element includes disposing the outer case about the engine subassembly and wherein after the outer case is disposed about the engine subassembly, further includes disposing a fan rotor blade in the fan rotor disk and then rotating the rotor assembly during assembly with respect to stator assembly by applying the turning moment to the rotor assembly and then disposing another fan blade in the fan rotor disk.

4. The method of assembling a rotary machine of claim 2 wherein the step of radially engaging the seal land with at least a portion of the first element includes engaging the seal land such that an interference fit exists at the minimum clearance dimension with respect to the average diameter Dav at said axial location and in the cruise operative condition has a reduced clearance as compared to the same construction which has a clearance which is greater than an interference fit at the minimum clearance dimension.

5. The method of assembling a rotary machine of claim 2 wherein the step of rotating the rotor assembly during assembly by applying a turning moment includes applying a turning moment of less than one hundred foot pounds force and wherein the turning moment required to rotate the rotor assembly with no lubricant is greater than six hundred foot pounds force.

6. The method of assembling a rotary machine of claim 5 wherein the turning moment is less than forty-foot pounds force.

7. The method of assembling a rotary machine as claimed in claim 1 wherein the step of applying a lubricant to the surface of the first seal land is performed by applying a lubricant in fluid form to the surface of the first seal land.

8. The method of assembling a rotary machine of claim 7 wherein the stator assembly having the seal land is formed of an aluminum alloy, wherein the rotor assembly is formed of a titanium alloy and wherein the rotor blades are formed of a titanium alloy and wherein the lubricant is an oil compatible with the titanium alloys and the aluminum alloy.

9. The method of assembling rotary machine as claimed in claim 8 wherein the seal land is formed of an elastomeric material and the step of disposing a lubricant is disposing a silicone oil on the seal land.

10. The method of assembling a rotary machine as claimed in claim 9 wherein the step rotating the rotor assembly by applying a turning moment includes applying a turning moment (torque) which is less than forty foot pounds force.

11. The method of assembling a rotary machine of claim 2 wherein the rotor element is a blade and wherein the step of disposing the first seal land relative to the first element is performed by disposing a rubstrip outwardly of the rotor blade, the rubstrip being formed of an elastomeric material.

12. The method of assembling a rotary machine of claim 2 wherein the rotor element is a knife edge element and wherein the step of disposing the seal land relative to the first rotor element is performed by disposing an inner air seal land with respect to the knife edge element which comprises an elastomeric material and wherein the step of applying a lubricant to the first seal land is performed by applying the lubricant to the inner air seal land.

13. The method of assembling the rotary machine of claim 2 wherein the first rotor element is a knife edge element, the first seal land receiving the lubricant is the inner air seal land disposed adjacent the knife edge element and wherein the rotary machine further includes an array of second rotor elements which are an array of rotor blades, wherein the rotary machine further includes an outer seal land having an associated average diameter Dav which is disposed outwardly of the array of rotor blades and the rotor blades have a minimum clearance dimension which has an interference fit at the associated axial location.

14. The method of assembling a rotary machine of claim 13 wherein the method includes applying a lubricant to the surface of the outer air seal land which extends circumferentially about the array of rotor blades.

15. The method of assembling a rotary machine as claimed in claim 14 wherein the array of rotor blades is the rearmost array of rotor blades and wherein each of the rotor blades has a tip having a chordwise length and wherein the step of radially engaging the seal land further includes radially engaging the seal land with the array of rotor blades such that the minimum clearance dimension of the rotor blades is an interference fit along the length of the tip of the rotor blades as measured in the chordwise direction.

16. The method of assembling a rotary machine as set forth in claim 15 wherein the method includes the additional step of inserting a fan rotor blade into the fan rotor disk and wherein the step of rotating the rotor assembly during the assembly takes place during the additional step of inserting the fan rotor blade.

17. A method of assembling a gas turbine engine having a low pressure compressor, the engine having a stator assembly and a rotor assembly, the rotor assembly extending axially through the engine about an axis of rotation Ar, the gas turbine engine having a stator assembly which circumscribes the rotor assembly, the stator assembly further including an outer case formed from a circumferentially continuous structure which is split longitudinally into at least two axially and circumferentially extending portions, the circumferentially extending portions being joined together in the assembled condition and supporting and positioning at least one inner seal land and at least one air outer seal land such that each seal land is not a perfect circle at a first axial location on each seal land and has an average diameter Dav at that location in the non-operative condition, each outer seal land extending circumferentially with respect to an array of rotor blades, each inner seal land extending circumferentially with respect to a knife edge element for blocking the flow of working medium gases from the flowpath under operative conditions, comprising:

orienting a gas turbine engine subassembly to receive an outer case assembly, the subassembly including at least part of a rotor assembly of the low pressure compressor which includes the fan rotor disk but does not include the fan rotor blades;

disposing a silicone oil lubricant on a surface of at least three of the inner air seal lands and on the surfaces of at least two of the rear most outer air seal lands of the low pressure compressor;

disposing the outer case assembly about the engine subassembly, each seal land having at the associated first axial location an associated tolerance band having a minimum clearance dimension and a maximum clearance dimension as measured with respect to the average diameter Dav that defines the relative radial position of each seal land with respect to the rotor assembly, and engaging each of said at least two rearmost outer air seal lands with an associated array of rotor blades which is axially aligned with the seal lands and engaging said inner air seal lands such that at least a portion of the knife edges of at least three of the associated inner air seal lands engages the associated seal land with an interference fit over at least a portion of the circumferential travel of the rotor element;

rotating the low pressure rotor assembly about the axis of rotation by applying a torque of less than one hundred foot pounds force to the rotor assembly;

assembling a fan rotor blade to the rotor assembly;

repeating at least one time the steps of rotating the low pressure rotor assembly and assembling a fan rotor blade;

wherein the step of applying the silicone oil to the inner seal and the outer seal is performed prior to the step of rotating the low pressure rotor assembly about the axis of rotation and assembling a fan rotor blade to the rotor assembly.

18. The method of assembling a gas turbine engine of claim 17 wherein the step of disposing the outer case assembly further includes having at one of said seal lands a positive clearance at the minimum clearance and an interference fit of at least ten mils (0.010 inches) and having at the rearmost associated array of rotor blades has a minimum clearance of zero at the associated first axial clearance.

19. The method of assembling a gas turbine engine as claimed in claim 18 wherein the rotor blades have a stacking line and wherein the associated first axial location of the rotor blade is at the stacking line of the rotor blade.

20. The method of assembling a gas turbine engine as claimed in claim 17 wherein the at least one seal land is formed of an elastomeric material and the step of disposing a lubricant is disposing a silicone oil on the seal land.

21. The method of assembling a gas turbine engine of claim 20 wherein the at least one seal land is silicone rubber.

* * * * *